(12) United States Patent  
Akita et al.

(10) Patent No.: US 7,026,735 B2
(45) Date of Patent: Apr. 11, 2006

(54) STATOR OF ROTATING ELECTRIC MACHINE

(75) Inventors: Hiroyuki Akita, Tokyo (JP); Yutaka Hirota, Tokyo (JP); Atushi Ohashi, Tokyo (JP); Yoshihiro Harada, Tokyo (JP); Wakaki Miyaji, Tokyo (JP); Toshiaki Kashihara, Tokyo (JP); Hitoshi Isoda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/873,167

(22) Filed: Jun. 23, 2004

(65) Prior Publication Data

US 2005/0082923 A1    Apr. 21, 2005

(30) Foreign Application Priority Data

Oct. 17, 2003   (JP) .............................. 2003-357268

(51) Int. Cl.
*H02K 11/00* (2006.01)

(52) U.S. Cl. .................. 310/71; 310/184; 310/216
(58) Field of Classification Search ........ 310/179–180, 310/184, 198, 202, 207–208, 71, 216–218
See application file for complete search history.

(56) References Cited

U.S. PATENT DOCUMENTS

| 4,215,464 A | * | 8/1980 | Miller .......................... 29/596 |
| 4,219,748 A | * | 8/1980 | Sakaguchi et al. ............ 310/71 |
| 4,260,917 A | * | 4/1981 | Lundin et al. ................ 310/71 |
| 4,698,533 A | * | 10/1987 | Kindig et al. ................. 310/71 |
| 6,373,163 B1 | | 4/2002 | Oohashi et al. |
| 6,376,961 B1 | | 4/2002 | Murakami et al. |
| 6,501,204 B1 | | 12/2002 | Oohashi et al. |
| 6,882,067 B1 | * | 4/2005 | Higashino et al. ............ 310/51 |
| 2003/0071534 A1 | | 4/2003 | Kreuzer et al. |

* cited by examiner

*Primary Examiner*—Thanh Lam
(74) *Attorney, Agent, or Firm*—Leydig, Voit & Mayer, Ltd.

(57) ABSTRACT

A stator of a rotating electric machine includes a stator core, multiple pairs of coils and multiple leads. The stator core includes a laminated core assembly formed by laminating thin steel plates in a cylindrical form, the stator core having multiple slots at intervals along a circumferential direction. Each coil pair is made of two elongate conductors which are folded back outside axial end surfaces of the stator core and fitted into the slots such that the two conductors are disposed alternately in inner and outer layers in a slot depth direction at intervals of a fixed number of slots. The multiple leads for connecting the coil pairs to an external electric circuit are arranged in at least one group and the leads of the same group extend from positions of those slots which are located adjacent to one another along the circumferential direction.

4 Claims, 8 Drawing Sheets

STATOR OF ROTATING ELECTRIC MACHINE

BACKGROUND OF THE INVENTION

1. Field of the Invention

The present invention relates generally to a stator of a rotating electric machine, such as a motor, and a method of manufacturing the stator. More particularly, the invention pertains to a wire-connecting structure for a distributed winding configuration of traverse wound coils.

2. Description of the Background Art

A stator of a rotating electric machine includes a stator core, coils wound on the stator core and insulators installed in multiple slots in the stator core for insulating the coils from the stator core.

The stator core has a cylindrical structure made of laminated thin steel plates. The multiple slots extending parallel to a central axis of the stator core are formed therein at specific intervals along an inner circumferential direction of the stator core, the individual slots opening to the interior of the stator core. When installing the coils in the stator core, a laminated core assembly is stretched in a beltlike form to make the width of each slot larger than the width of coil conductors so that the conductors having the larger width can be fitted into the slots. After the coils have been fitted into the slots in this way, both ends of the beltlike laminated core assembly are positioned against each other to form an annular structure and joined together by welding, for example, to complete the stator core.

A conventional form of winding the coils is a wave winding structure in which coil ends of each conductor are folded back outside axial end surfaces of the stator core. To realize efficient use of internal spaces of the slots, two sets of coils are wound at intervals of a specific number of slots in such a way that two conductors constituting a conductor pair are disposed alternately in inner and outer layers in a depth direction of the slots, constituting a three-phase distributed winding configuration. Leads of the three-phase coils are connected to terminals of the three-phase configuration that are connected to an external electric circuit as shown in Japanese Laid-open Patent Publication No. 2001-211584.

According to the Patent Publication, jumpers for connecting the coils of each set in series are connected at regular intervals, or the conductors in the same layer are joined to each other, at one axial end of the stator core to improve efficiency of wiring work. For this reason, the leads of the coils are disposed at locations separated from one another along the circumferential direction of the stator core. In this structure, it is necessary to route around the leads from their separated locations for properly connecting the leads, requiring a large space in the circumferential direction.

SUMMARY OF THE INVENTION

The present invention is intended to solve the aforementioned problem of the prior art. Accordingly, it is an object of the invention to provide a stator of a rotating electric machine and a manufacturing method thereof employing a lead wire structure which makes it possible to reduce the physical size of the stator requiring a reduced amount of space for lead wire connections, reduce time necessary for installing coils and improve manufacturing efficiency of the coils.

According to the invention, a stator of a rotating electric machine includes a stator core, multiple pairs of coils and multiple leads. The stator core includes a laminated core assembly formed by laminating thin steel plates in a cylindrical form, the stator core having multiple slots formed therein at specific intervals along a circumferential direction of the stator core. Each coil pair is made of two elongate conductors which are folded back outside axial end surfaces of the stator core and fitted into the slots in such a way that the two conductors of each coil pair are disposed alternately in inner and outer layers in a slot depth direction at intervals of a specific number of slots. The multiple leads are taken out from the stator core so that the multiple coil pairs can be connected to an external electric circuit. In this stator of the rotating electric machine, the multiple leads are arranged in at least one group and the leads of the same group are taken out from positions of those slots which are located adjacent to one another along the circumferential direction of the stator core.

According to the invention, a method of manufacturing the aforementioned stator of the rotating electric machine includes the steps of stretching the laminated core assembly in a straight beltlike form, installing the coils in the laminated core assembly in such a way that the multiple leads are arranged in at least one group and the leads of the same group are taken out from positions of those slots which are located adjacent to one another along the circumferential direction of the stator core, and joining both ends of the beltlike laminated core assembly to each other to complete the stator core having the cylindrical form.

The aforementioned structure of the stator of the rotating electric machine and the manufacturing method thereof make it possible to reduce the amount of space required for lead wire connections and to reduce the size of the stator. The stator of the present invention is suited to an alternating current (AC) generator used in a vehicle, for instance.

These and other objects, features and advantages of the invention will become more apparent upon reading the following detailed description in conjunction with the accompanying drawings.

DESCRIPTION OF THE PREFERRED EMBODIMENTS

The invention is now described with reference to specific embodiments thereof which are illustrated in the appended drawings.

First Embodiment

Figure 1:
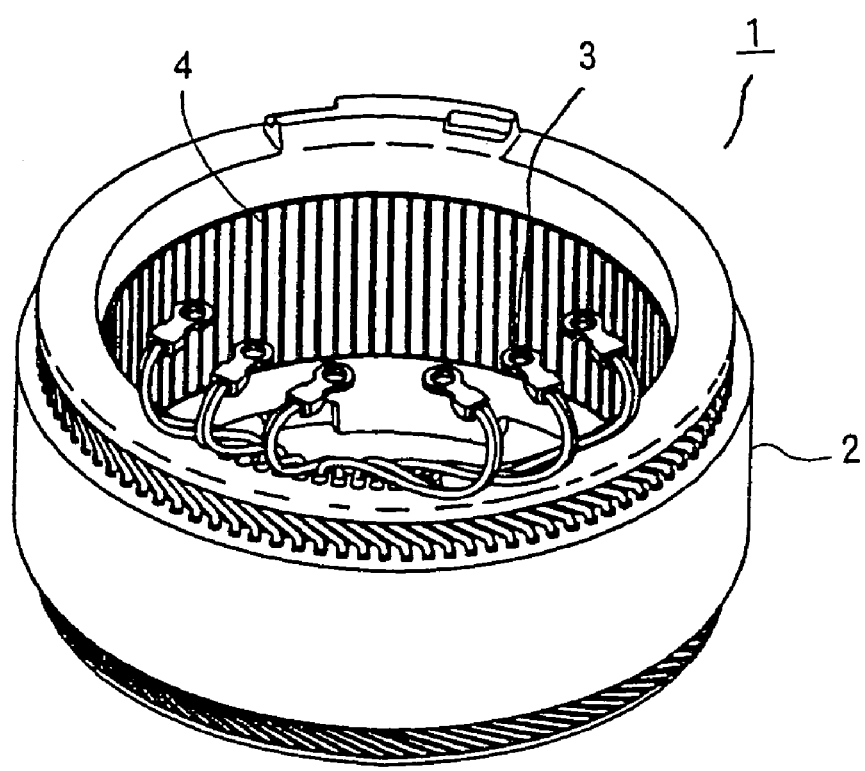
FIG. 1 is a perspective diagram showing the construction of a stator of a rotating electric machine according to a first embodiment of the invention.

FIG. 1 is a perspective diagram showing the construction of a stator 1 of a rotating electric machine according to a first embodiment of the invention.

As shown in FIG. 1, the stator 1 includes a stator core 2 made of laminated thin steel plates and coils 5 fitted into multiple slots 4 formed in a cylindrical inner surface of the stator core 2 at specific intervals along an inner circumferential direction, the slots 4 extending parallel to a central axis of and opening to the interior of the stator core 2. Leads 3 of the coils 5 are taken out of adjacent slots 4, so that locations of the leads 3 are concentrated in one area.

Figure 2:
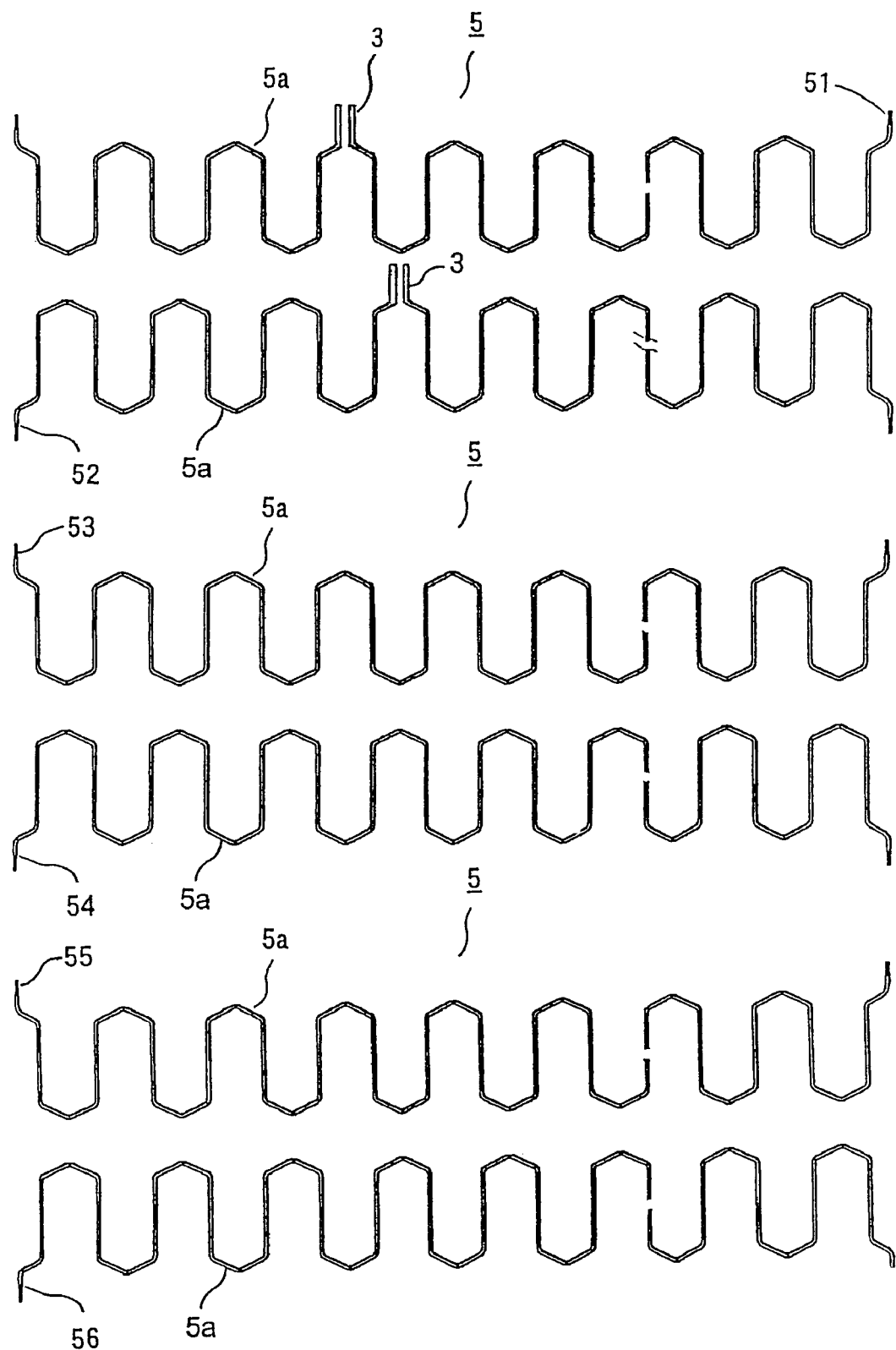
FIG. 2 is a plan view showing shapes of coils.

FIG. 2 is a plan view showing shapes of the coils 5. The coils 5 form a wave winding structure in which coil ends 5a are folded back outside axial end surfaces of the stator core 2 as shown in FIG. 2. The coils 5 are made up of three pairs of wires, that is, a first wire 51 and a second wire 52, a third wire 53 and a fourth wire 54, and a fifth wire 55 and a sixth wire 56 which are fitted into the slots 4.

Figure 3:
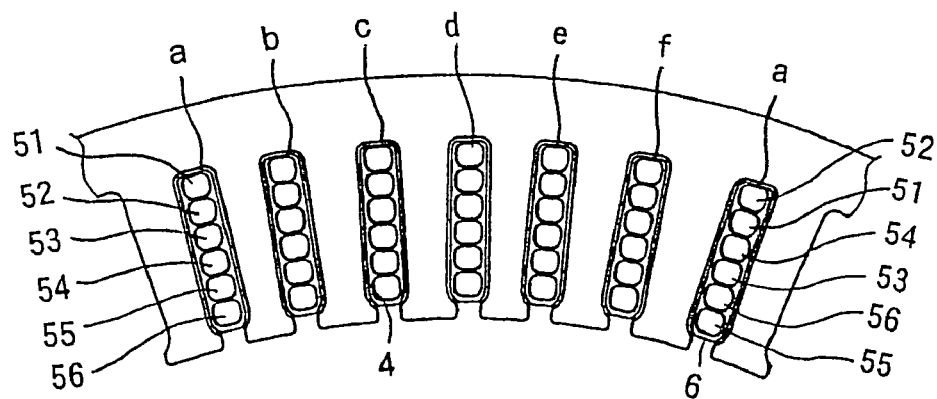
FIG. 3 is a fragmentary sectional diagram showing multiple coil pairs installed in slots formed in a stator core.

FIG. 3 is a fragmentary sectional diagram showing multiple coil pairs installed in the slots 4. As shown in FIG. 3, the pair of the first and second wires 51, 52 is fitted in the slots 4 at intervals of a specific number of slots (first and seventh slots "a" at six-slot intervals in the illustrated example) in such a way that the first wire 51 and the second wire 52 are disposed alternately in inner and outer layers in a slot depth direction. Likewise, the pair of the third and fourth wires 53, 54, and the pair of the fifth and sixth wires 55, 56, are fitted in the slots 4 at intervals of the same number of slots in such a way that the third wire 53 and the fourth wire 54, and the fifth wire 55 and the sixth wire 56, are fitted alternately in inner and outer layers in the slots 4. Two sets of coils 5 for three phases (U, V, W) are fitted in the slots 4 which are designated slots "a," "b," "c," "d," "e" and "f" in this order as illustrated. In this embodiment, the coils 5 for the U phase are fitted in the slots "a" and "d," the coils 5 for the V phase are fitted in the slots "b" and "e," and the coils 5 for the W phase are fitted in the slots "c" and "f."

Figure 4:
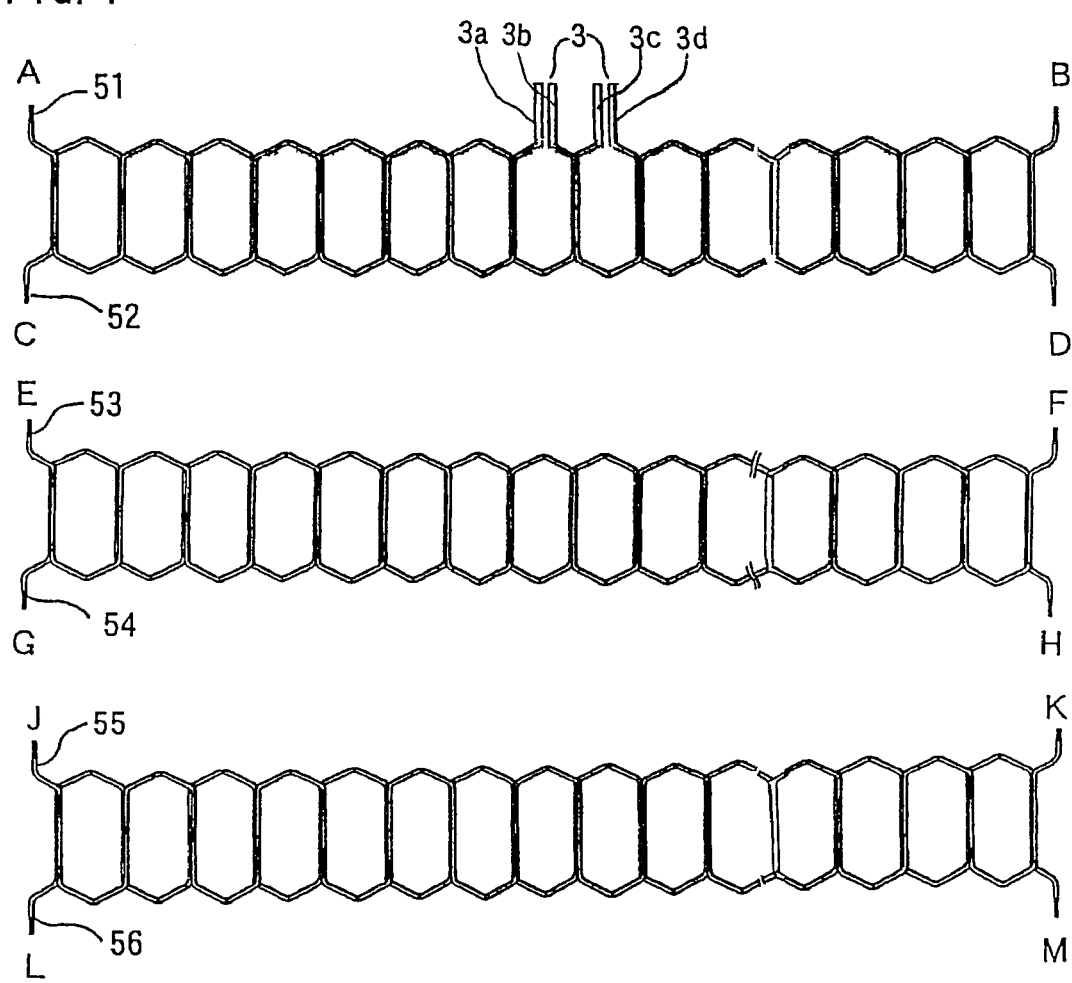
FIG. 4 is a plan view showing how individual wires fitted in slots "a" and leads of the wires are connected.

FIG. 4 is a plan view showing how the individual wires 51–56 fitted in the slots "a" are connected. In FIG. 4, the first wire 51 and the second wire 52 are not connected at their ends and the leads 3 are taken out of the wires 51, 52, whereas the other wires 53, 54, 55, 56 have no leads between their ends. When installing the coils 5 in the stator core 2, a laminated core assembly is stretched in a straight beltlike form and the first to sixth wires 51, 52, 53, 54, 55, 56 are fitted in the slots "a" in a prescribed order. Wires for the slots "b," "c," "d," "e" and "f" are also fitted in a similar fashion. Then, both ends of the beltlike laminated core assembly are positioned against each other to form an annular structure and joined together to complete the stator core 2. Subsequently, wire ends B and E, F and J, K and A, D and G, H and L, and M and C, for example, are individually connected to each other. Then, the inside leads 3b and 3c, among the four leads 3 shown in FIG. 4, are connected to each other, whereby a coil of six turns in which the first to sixth wires 51, 52, 53, 54, 55, 56 are connected in series is installed in the stator core 2. This coil is made of the series-connected six wires 51–56 wound in each of the slots "a" in six turns.

The wires 51-56 need not necessarily be connected as mentioned above but may be connected in various ways. As an example, after connecting the wire ends B and E, F and J, K and A, D and G, H and L, and M and C as stated above, 3a and 3c, and 3b and 3d, of the four leads 3 shown in FIG. 4 may be connected to each other so that a series circuit including the wire ends B, E, F, J, K and A and a series circuit including the wire ends D, G, H, L, M and C are connected in parallel with each other.

Figure 6:
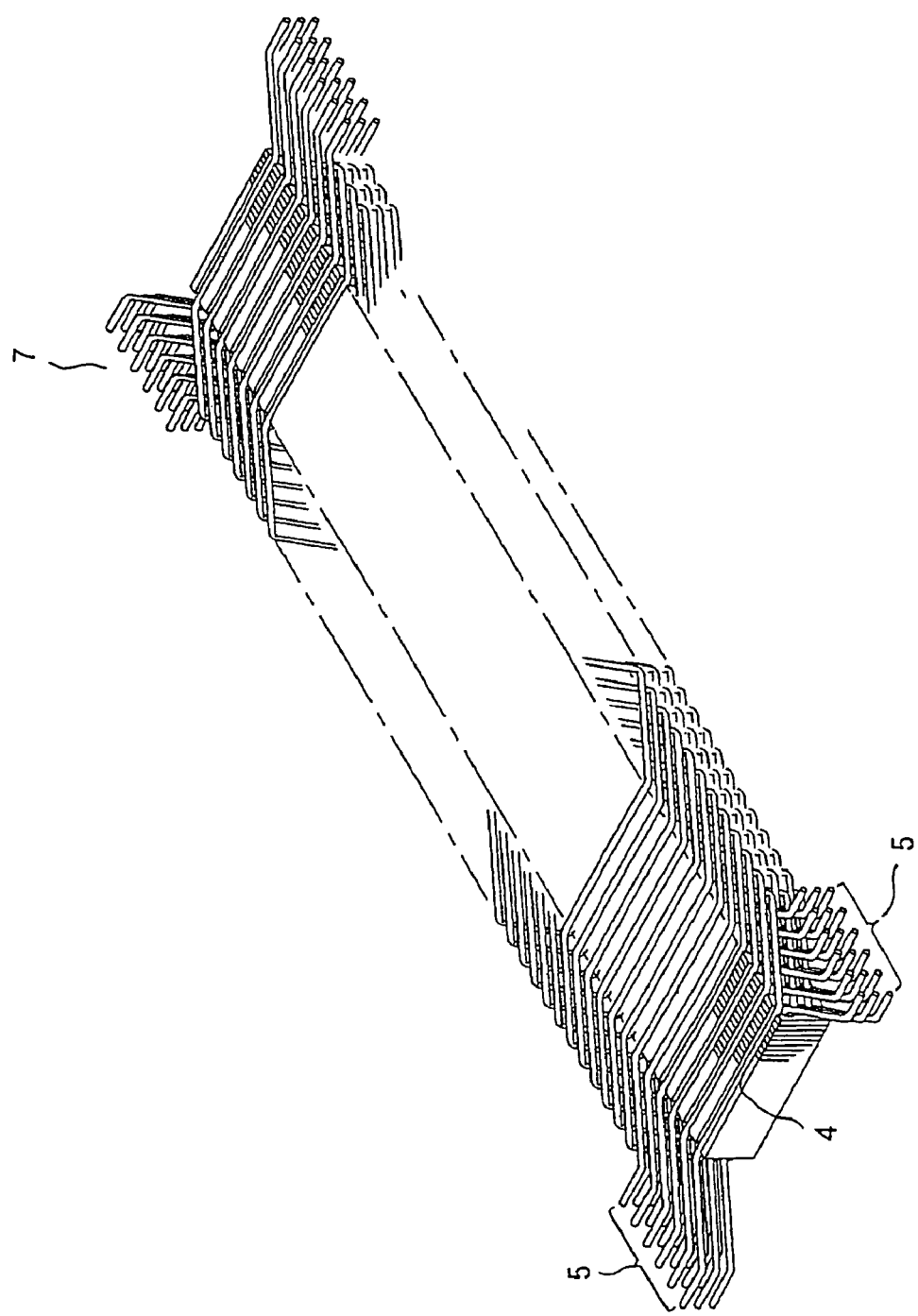
FIG. 6 is a perspective view showing how the coil assemblies are fitted in the slots in the stator core.

As shown in FIG. 6, the individual wires 51–56 are installed in the stator core 2 in such a way that both ends of each of the wires 51–56 are fitted in those slots 4 which are located adjacent to one another inward from both ends of the beltlike laminated core assembly which are joined to each other. The leads 3 are located at positions of the (3m+1)th to (3m+n)th adjacent slots 4 from a butt joint position of the stator core 2, where m is an arbitrary integer and n is the number of phases (=3) multiplied by the number of sets of the three-phase coils 5. With this arrangement, the ends of the wires 51–56 are situated in the adjacent slots 4 when both ends of the laminated core assembly are joined to each other, and the leads 3 are taken out from positions of the slots 4 in which end joint portions of the wires 51–56 are not fitted.

Shown in FIG. 6 is an example of a relationship of the locations of the ends and the end joint portions of the wires 51–56 and the slots 4.

Since there are two sets of the three-phase coils 5 as stated above in this example, n=3×2=6. Therefore, ends of six conductors of the first wire 51, for example, are fitted in the first to sixth slots 4 from the butt joint position of the stator core 2. Then, the six conductors, of which locations have been switched from the inner to outer layer in the slot depth direction, are next fitted in the seventh to thirteenth slots 4. The six conductors are fitted at six-slot intervals thereafter.

The ends of the six conductors are fitted in the first to sixth slots 4 as mentioned above. When both ends of the laminated core assembly are positioned against each other to form the annular structure and joined to each other, positions of the end joint portions of the six conductors are offset from the positions of the slots 4 in which the conductors are fitted particularly in the circumferential direction of the stator core 2 as shown in FIG. 6, because the coils 5 are wound in the wave winding structure as stated earlier.

More specifically, the circumferential positions of the end joint portions of the three conductors fitted in the first, second and third slots 4 located inward from the butt joint position of the stator core 2 match the positions of three adjacent slots 4 located outward from the butt joint position of the stator core 2. Also, the circumferential positions of the end joint portions of the three conductors fitted in the fourth, fifth and sixth slots 4 from the butt joint position of the stator core 2 match the positions of the first, second and third slots 4 located inward from the butt joint position of the stator core 2.

Therefore, it is possible to prevent a problem that the positions of the leads 3 coincide with the positions of the end joint portions of the conductors if the leads 3 are situated at the positions of the fourth to ninth slots 4 which correspond to the (3m+1)th to (3m+n)th slots 4 with substitutions of m=1 and n=6.

Figure 5A:
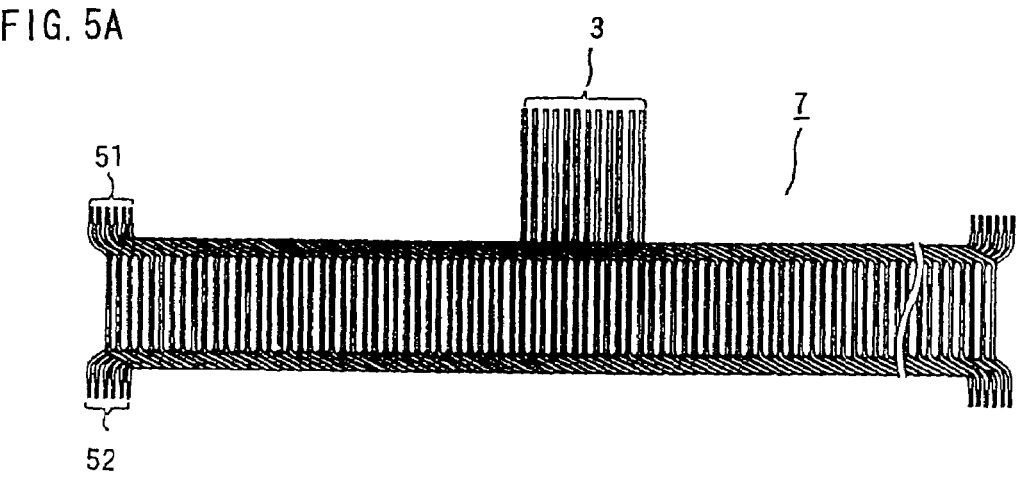
FIGS. 5A, 5B and 5C are plan views of coil assemblies formed by combining coils to be fitted in slots "a," "b," "c," "d," "e" and "f"
Figure 5B:
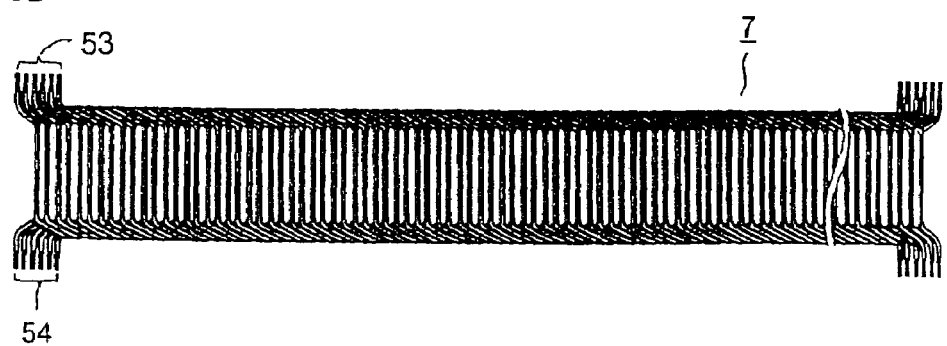
Figure 5C:
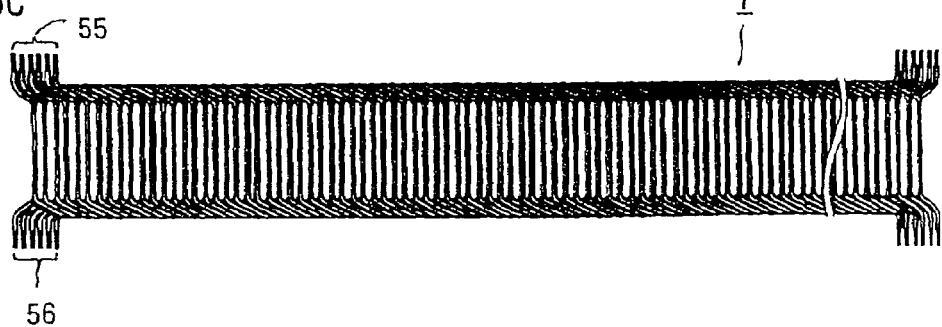

FIGS. 5A, 5B and 5C are plan views of coil assemblies 7 formed by combining the coils 5 to be fitted in the slots "a," "b," "c," "d," "e" and "f." FIG. 6 is a perspective view showing how the coil assemblies 7 are fitted in the slots 4.

As shown in FIG. 5A, the leads 3 are taken out from the adjacent slots 4 in the stator core 2 between the ends of the first and second wires 51, 52. FIG. 5A shows the pair of the first wire 51 and the second wire 52, FIG. 5B shows the pair of the third wire 53 and the fourth wire 54, and FIG. 5C shows the pair of the fifth wire 55 and the sixth wire 56. While 12 leads 3 are illustrated in FIG. 5A, there exists another lead 3 just behind each of the 12 leads 3. Thus, there are actually a total of 24 leads 3.

As already mentioned the coil assemblies 7 are installed in the stator core 2 with the laminated core assembly stretched in a straight beltlike form as shown in FIG. 6. After the coil assemblies 7 have been installed in the stretched beltlike laminated core assembly, both ends of the laminated core assembly are joined to each other by welding, for example, to form the cylindrical stator core 2. While three pairs of wires (first to sixth) are installed in the slots "a" to "f" in the example of FIG. 6, the number of wire pairs is not limited to three.

Furthermore, although the leads 3 are provided on the pair of the first wire 51 and the second wire 52 as shown in FIG. 5A in the present embodiment, the leads 3 may be provided on the pair of the third wire 53 and the fourth wire 54 or on the pair of the fifth wire 55 and the sixth wire 56.

Figure 7A:
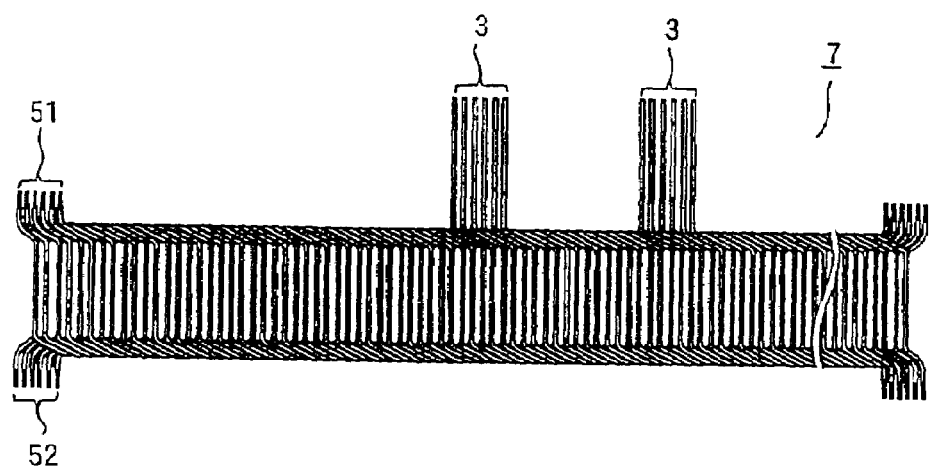
FIGS. 7A, 7B and 7C are plan views showing an example in which leads are provided at two separate locations.
Figure 7B:
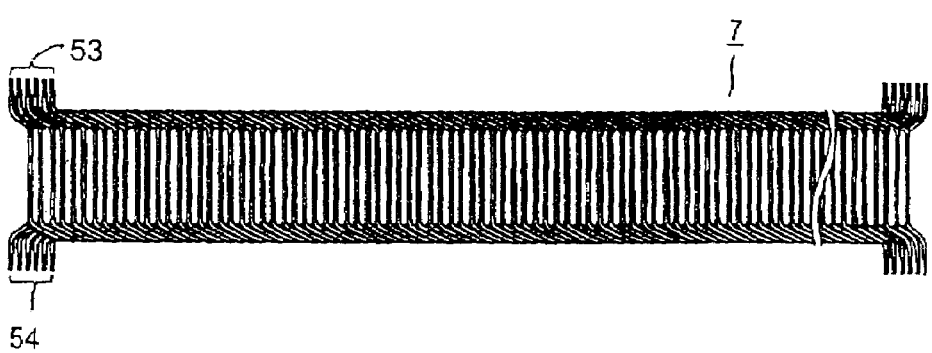
Figure 7C:
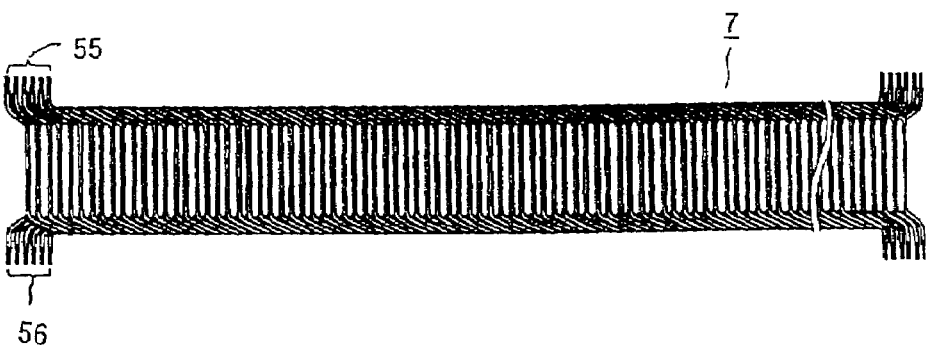

Furthermore, the leads 3 may be divided into two groups and taken out of adjacent slots 4 at two separate locations of the stator core 2 as shown in FIG. 7A. While FIGS. 7A, 7B and 7C show an example in which the two groups of leads 3 are provided on the pair of the first wire 51 and the second wire 52, the two groups of leads 3 may be provided on the pair of the third wire 53 and the fourth wire 54 or on the pair of the fifth wire 55 and the sixth wire 56.

Figure 8A:
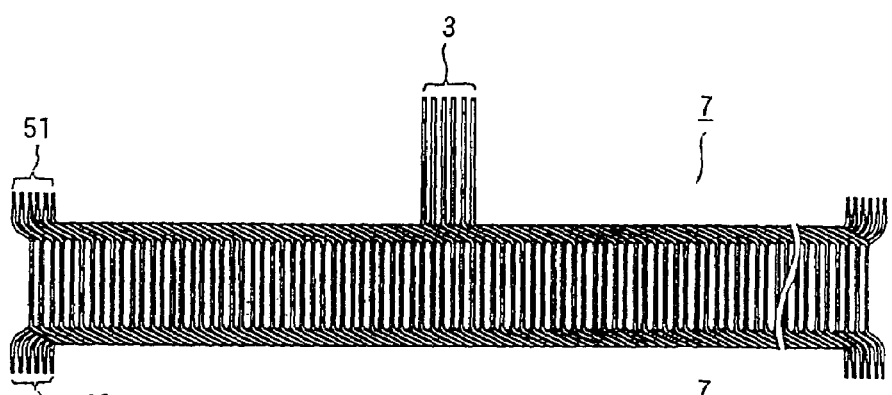
FIGS. 8A, 8B and 8C are plan views showing another example in which leads are provided at two separate locations.
Figure 8B:
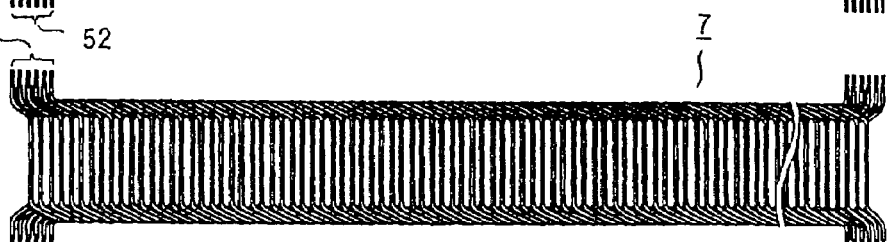
Figure 8C:
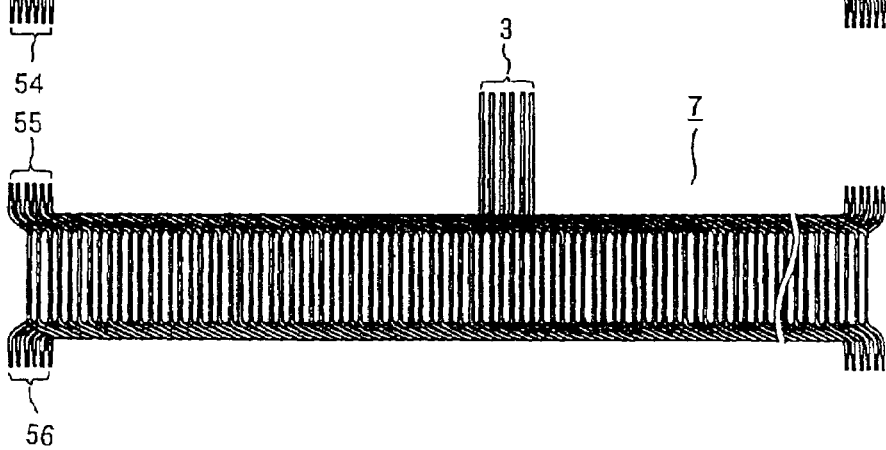

Also, the leads 3 may be divided into two groups and taken out of adjacent slots 4 at two separate locations of the stator core 2 in such a way that one group of leads 3 is provided on the pair of the first wire 51 and the second wire 52 and another group of leads 3 is provided on the pair of the fifth wire 55 and the sixth wire 56, for example, as shown in FIGS. 8A, 8B and 8C.

As all of the leads 3 are concentrated in one area or multiple groups of the leads 3 are concentrated in two or more areas at one of the axial end surfaces of the stator core 2 in the aforementioned manner, it is possible to reduce the amount of space for connecting the leads 3 and thereby achieve a reduction in size of the stator core 2.

Figure 9:
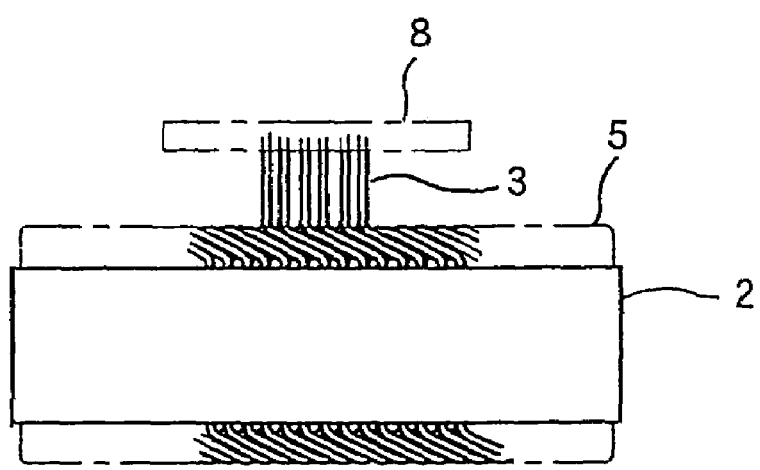
FIG. 9 is a side view showing an alternative arrangement of the leads according to the first embodiment of the invention.

FIG. 9 is a side view showing another example of an arrangement of the leads 3 according to the first embodiment of the invention. In this example, the leads 3 extend generally at right angles to one of the axial end surfaces of the stator core 2 as illustrated. The leads 3 extending at right angles are connected to an external electric circuit as ends of the leads 3 are inserted into a connecting circuit board 8 which is connected to the external electric circuit.

As the ends of the leads 3 extending at right angles to one of the axial end surfaces of the stator core 2 are inserted into the connecting circuit board 8 in this fashion, it is possible to reduce the size of a joint portion between the leads 3 and the external electric circuit and facilitate wire connecting work.

Second Embodiment

The leads 3 are provided between both ends (not at the ends) of one or two pairs of wires (coil assemblies 7) in the aforementioned first embodiment.

In a second embodiment of the invention, ends of particular wires are used as leads 3. This means that the leads 3 are located at the butt joint position of the stator core 2, where both ends of the stretched beltlike laminated-core assembly are joined to each other. Specifically, the individual coil assemblies 7 are installed in the stator core 2 with the laminated core assembly stretched in a straight beltlike form in such a way that the ends of the wires are situated at adjacent slots 4 located adjacent to one another inward from both ends of the beltlike laminated core assembly. Subsequently, both ends of the laminated core assembly are positioned against each other to form an annular structure and joined to each other and the ends of individual pairs of wires of each phase are connected to form the leads 3.

When the ends of the particular wires are used as leads, the leads 3 of the first and second wires 51, 52 are not provided as shown in FIG. 4, but the wires are connected in a wave winding structure in which the individual wires are connected at coil ends. As an example, wire ends B and E, F and J, D and G, H and L, and M and C are individually connected to each other and a coil end projecting upward from the wire end C is cut. Leads are joined to both wire ends formed by cutting the coil end and the leads joined to the cut wire ends and wire ends A and K are used as the leads 3.

In the earlier-described first embodiment, it is necessary to not only connect the individual leads 3 but also connect jumpers between the ends of the individual wires 51–56 after joining both ends of the laminated core assembly. In addition, it is necessary to provide a space for connecting the jumpers after both ends of the laminated core assembly have been joined together. In the second embodiment, however, the space for connecting the jumpers between the ends of the individual wires 51–56 is not required after both ends of the laminated core assembly have been joined together, and the coil ends projecting from the axial end surfaces of the stator core 2 can be compactly shaped.

What is claimed is:

1. A stator of a rotating electric machine, said stator comprising:
   a stator core including a laminated core assembly of laminated thin steel plates having a cylindrical form, the stator core having multiple slots therein at intervals along a circumferential direction of the stator core;
   multiple pairs of coils, each coil pair including two elongate conductors which are folded back, outside axial end surfaces of the stator core, and fitted into the slots in such a way that the two conductors of each coil pair are disposed alternately in inner and outer layers in a slot depth direction at intervals of a fixed number of slots; and
   multiple leads extending from the stator core for connecting the multiple coil pairs to an external electric circuit, wherein the multiple leads are arranged in at least one group and the leads of the each group extend from slots which are located adjacent to one another along the circumferential direction of the stator core.

2. The stator according to claim 1, wherein respective ends of each conductor of the coils are fitted in slots which are located adjacent to one another, and the leads extend from the slots, except for the slots in which the ends of the conductors of the coils are fitted.

3. The stator according to claim 1, wherein respective ends of each conductor of the coils are fitted in slots which are located adjacent to one another, and
   the leads extend from the ends of the conductors.

4. The stator according to claim 1, wherein the leads extend generally at right angles to an axial end surface of the stator core.

* * * * *